United States Patent
Perego et al.

(10) Patent No.: US 6,903,263 B2
(45) Date of Patent: Jun. 7, 2005

(54) ELECTRICAL CABLE, PARTICULARLY FOR HIGH VOLTAGE DIRECT CURRENT TRANSMISSION OR DISTRIBUTION, AND INSULATING COMPOSITION

(75) Inventors: Gabriele Perego, Milan (IT); Enrico Albizzati, Lesa (IT)

(73) Assignee: Pirelli, S.p.A., Milan (IT)

( * ) Notice: Subject to any disclaimer, the term of this patent is extended or adjusted under 35 U.S.C. 154(b) by 0 days.

(21) Appl. No.: 10/451,994

(22) PCT Filed: Dec. 14, 2001

(86) PCT No.: PCT/EP01/14765

§ 371 (c)(1),
(2), (4) Date: Dec. 22, 2003

(87) PCT Pub. No.: WO02/052582

PCT Pub. Date: Jul. 4, 2002

(65) Prior Publication Data

US 2004/0091707 A1 May 13, 2004

Related U.S. Application Data

(60) Provisional application No. 60/259,208, filed on Jan. 3, 2001.

(30) Foreign Application Priority Data

Dec. 27, 2000 (EP) .............................................. 00128567

(51) Int. Cl.$^7$ ................................................. H01B 7/34
(52) U.S. Cl. .................. 174/36; 174/110 R; 174/120 R
(58) Field of Search ............................. 174/36, 110 R, 174/113 R, 120 R, 121 R (56) References Cited

U.S. PATENT DOCUMENTS

| | | | | |
|---|---|---|---|---|
| 4,017,669 A | * | 4/1977 | Collette et al. | 526/169.2 |
| 4,743,644 A | * | 5/1988 | Skipper et al. | 524/437 |
| 5,208,286 A | * | 5/1993 | Sjostrom et al. | 525/57 |
| 5,412,024 A | * | 5/1995 | Okada et al. | 524/577 |
| 6,492,475 B1 | * | 12/2002 | Egashira et al. | 526/153 |
| 2002/0058736 A1 | * | 5/2002 | Zolotnitsky et al. | 524/404 |

FOREIGN PATENT DOCUMENTS

EP 0463402 A2 1/1992

(Continued)

OTHER PUBLICATIONS

"Production of Modified Polymers Used as Reinforcing Layers—By Graft–Polymerising Allyl Compounds Onto Polyolefin(s)", Abstract of JP 03149207, Jun. 1991.

(Continued)

Primary Examiner—William H. Mayo, III
(74) Attorney, Agent, or Firm—Finnegan, Henderson, Farabow, Garrett & Dunner, L.L.P.

(57) ABSTRACT

Electrical cable particularly for high voltage direct current transmission having at least once conductor and at least one extruded insulating coating layer of a polymeric composition. The polymeric composition is a polyethylene modified with at least one compound of formula (I):

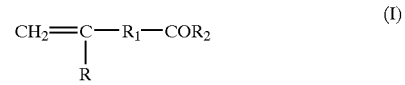

in which R represents H or $CH_3$; $R_1$ represents a linear or branched, preferably linear, $C_1$–$C_8$ alkylene group; $R_2$ represents OH; a group $OR_3$ in which $R_3$ represents a linear or branched $C_1$–$C_4$ alkyl group, a group $NR_4R_5$ in which $R_4$ and $R_5$, which may be identical or different, represent H, or a linear or branched $C_1$–$C_4$ alkyl group, and related insulating composition.

58 Claims, 1 Drawing Sheet

FOREIGN PATENT DOCUMENTS

| | | |
|---|---|---|
| JP | 2-10610 | 1/1990 |
| JP | 04-118808 | 4/1992 |
| JP | 10-28351 | 10/1998 |
| WO | WO 98/52197 | 11/1998 |
| WO | WO 99/40589 | 8/1999 |
| WO | WO 99/44207 | 9/1999 |
| WO | WO 00/08655 | 2/2000 |

OTHER PUBLICATIONS

"DC Power Cable—Manufacture by Coating Crosslinking Resin Composition", Abstract of JP 06215645, Aug. 1994.

"Direct Current Power Cable of Improved Heat Resistance–Prepared by Blending Polyethylene and Polarity Monomer e.g. Vinl Acetate and Crosslinking in Presence of Organic Peroxide", Abstract of JP 05266724, Oct. 1993.

* cited by examiner

Fig. 1

ELECTRICAL CABLE, PARTICULARLY FOR HIGH VOLTAGE DIRECT CURRENT TRANSMISSION OR DISTRIBUTION, AND INSULATING COMPOSITION

CROSS REFERENCE TO RELATED APPLICATIONS

This application is a national phase application based on PCT/EP01/14765, filed Dec. 14, 2001 the content of which is incorporated herein by reference, and claims the priority of European Patent Application No. 00128567.5, filed Dec. 27, 2000, and claims the benefit of U.S. Provisional Application No. 60/259,208, filed Jan. 3, 2001.

BACKGROUND OF THE INVENTION

1. Field of the Invention

The present invention relates to an electrical cable, particularly for high voltage direct current transmission or distribution, and to the insulating composition used therein.

More particularly, the present invention relates to an electrical cable, particularly for high voltage direct current transmission or distribution, which is suitable for either terrestrial or submarine installations, comprising a conductor and an extruded insulating coating consisting of a polymeric composition comprising a polyethylene modified with at least one unsaturated carboxylic acid or a derivative thereof.

The present invention moreover relates to an insulating composition comprising a polyethylene modified with at least one unsaturated carboxylic acid or a derivative thereof.

For the purposes of the present description and the claims, the term "high tension" means a tension of greater than 35 kV.

2. Description of the Related Art

The cables generally used for high voltage direct current transmission, either along terrestrial lines or, particularly, along submarine lines, are cables commonly known in the art, such as mass-impregnated cables in which the conductor, coated with a first semiconducting layer, is electrically insulated by being wound with an insulating material, generally paper or paper/polypropylene/paper multilayer laminates, which is then totally impregnated with a mixture with high electrical resistivity and high viscosity, generally a hydrocarbon oil containing a viscosity-increasing agent. The cable then comprises a further semiconducting layer and a metal screen, generally made of lead, which is itself surrounded by at least one metal armouring structure and by one or more plastic protective sheaths.

Although mass-impregnated cables are characterized by high reliability in operation even at very high voltages (greater than 150 kV), they have a number of drawbacks mainly associated with migration of the insulating fluid inside the cable. Particularly, during use, the cable is subjected, owing to variations in the intensity of the current transmitted, to thermal cycles which cause migrations of the fluid in the radial direction. As a matter of fact, when the current carried increases and the cable heats up, the viscosity of the insulating fluid decreases and the fluid is subjected to a thermal expansion greater than all the other components of which the cable is made. This leads to migration of the fluid from the insulating layer towards the exterior and, consequently, to an increase in the pressure exerted on the metal screen, which is deformed in the radial direction. When the current carried decreases and the cable cools down, the impregnating fluid contracts, whereas the metal screen, which is made of a plastic material (usually lead), remains permanently deformed. This therefore results in a decrease of the internal pressure of the cable, leading to the formation of microcavities in the insulating layer with a consequent risk of electric discharges and, hence, of perforation of the insulation. The risk of perforation increases as the thickness of the insulating layer increases and, hence, as the maximum voltage for which the cable was intended increases.

Another solution for high voltage direct current transmission consists of cables with fluid oil, in which the insulation is provided by a pressurized oil of low viscosity and high electrical resistivity (under a hydrostatic head). Although this solution is highly effective in terms of avoiding the formation of microcavities in the cable insulation, it has a number of drawbacks mainly associated with the complexity of construction and, particularly, results in a limitation of the maximum permissible length of the cable. This limitation of the maximum length is a major drawback, especially as regards submarine use, in which the lengths required are usually very great.

For many years, research has been directed towards the possibility of using cross-linked polyolefins, and particularly cross-linked polyethylene (XLPE), to produce insulating materials for cables for direct current transmission. Insulating materials of this type are already widely used in the case of cables for alternating current transmission. The use of said insulating materials also in the case of cables for direct current transmission would allow said cables to be used at higher temperatures, for example at 90° C. instead of 50° C., compared with the mass-impregnated cables described above (higher working temperatures, making it possible to increase the amount of current transported) and would eliminate limitations in the maximum permissible length of the cable, in contrast with the cables containing fluid oil described above.

However, it has not hitherto been possible to adequately and fully exploit said insulating materials, particularly for direct current transmission. It is commonly believed that one of the main reasons for this limitation is the development and accumulation of so-called space charges in the dielectric insulating material when said material is subjected to a direct current. It is thought that space charges alter the distribution of the electrical field and persist for long periods on account of the high resistivity of the polymers used. The accumulation of space charges leads to a local increase in the electrical field, which is consequently greater than that which would be expected considering the geometrical dimensions and the dielectric properties of the insulating material.

The accumulation of space charges is a slow process: however, the problem is accentuated when the direct current transported by the cable is reversed (in other words, if there is a reversal of polarity). As a result of this reversal, a capacitive field is superimposed on the whole electrical field and the value of the maximum gradient can be localized within the insulating material.

It is known that a prolonged degassing treatment, which may be carried out, for example, by subjecting the insulating material based on a cross-linked polymer to high temperatures and/or to a high vacuum for a long period, makes it possible to obtain an insulating material which is capable of limiting the accumulation of space charges when the cable is subjected to polarity reversal. In general, it is thought that, by virtue of the removal of the decomposition products of the cross-linking agent (for example dicumyl peroxide which forms acetophenone and cumyl alcohol on decomposition) from the insulating material, said degassing treatment reduces the formation of space charges. However, a prolonged degassing treatment obviously leads to an increase in the production times and costs.

In efforts to reduce the accumulation of space charges, it is known practice to modify cross-linked polyethylene (XLPE) by introducing small amounts of polar groups.

For example, Japanese patent application JP-A-210 610 discloses a cross-linked polyethylene which is modified by grafting with an amount of maleic anhydride of between 0.02% and 0.5% by weight, this product said to be usable as an insulating material for cables for direct current transmission since it is said to be capable of trapping the space charges and thus reducing their accumulation.

Japanese patent application JP 10/283,851 discloses a cable for direct current transmission which has improved dielectric rigidity, in the presence of polarity reversals or following applications of electrical pulses, in which the insulating coating consists of a polymeric composition comprising a crosslinked polyolefin containing (i) a dicarboxylic acid anhydride and (ii) at least one monomer containing a polar group (chosen from at least one carbonyl, nitrile or nitro group). However, a particular peroxide, more specifically 2,5-dimethyl-2,5-di(t-butylperoxy)hexane, and a particular antioxidant, more specifically a thiocarboxylic acid ester, are required.

Patent application EP-A-0 463 02 discloses an ethylene (co)polymer containing polar groups chosen from ketone, nitrile and nitro groups in an amount of between 20 ppm and 8 000 ppm, said polar groups having a dipole moment of greater than 0.8 debye. Said (co)polymer is said to be usable as an insulating material for high voltage cables with improved dielectric rigidity.

Patent application WO 99/405589 relates to a cable for direct current transmission, in which the insulating coating consists of cross-linked polyethylene comprising polar groups obtained by pre-treating the polyethylene with molecular oxygen before extrusion.

Patent application WO 99/44207 relates to a cable for direct current transmission, in which the insulating coating consists of a polymeric composition based on cross-linked polyethylene modified with polar groups. Said polar groups, having the general formula: $CH_2=CR-CO-X-(CH_2)_n-N(CH_3)_2$ or $CH_2=CR-CO-O-(CH_2-CH_2O)_n-H$ in which n is 2 or 3, m is a number between 1 and 20, R is H or $CH_3$ and X is O or NH, are introduced into the cross-linked polyethylene by co-polymerization or grafting. Examples of said polar groups are dialkylaminopropyl (meth)acrylamide and (oligo)ethyleneglycolmethacrylate.

Japanese patent application JP 06/215 645 discloses a cable for high voltage direct current transmission which shows a reduced accumulation of space charges. The insulating coating is prepared by hot cross-linking of a blend of a polyethylene, an organic peroxide having a half-life at 130° C. of greater than 5 hours and an acid chosen from itaconic acid and crotonic acid in an amount of less than 5 parts by weight per 100 parts by weight of polyethylene.

Japanese patent application JP 05/266 724 discloses a cable for high voltage direct current transmission with a reduced accumulation of space charges. The insulating coating is prepared by:

adding to the polyethylene a compound chosen, for example, from vinyl acetate, benzoic acid, naphthoic acid and acrylic acid; or hot cross-linking of a blend of polyethylene, an organic peroxide with a half-life at 130° C. of greater than 5 hours and a compound chosen, for example, from vinyl acetate, benzoic acid, naphthoic acid and acrylic acid.

Said compound is present in an amount of up to 10 parts by weight per 100 parts by weight of polyethylene.

Patent application WO 00/08655 relates to a cable for direct current transmission, in which the insulating coating consists of a polymeric composition based on polyethylene added with an esterified (poly)glycerol containing at least two free OH groups.

SUMMARY OF THE INVENTION.

The Applicant has now found that it is possible to reduce the local accumulation of space charges in the insulating coating of an electrical cable, in particular a cable for high voltage direct current transmission or distribution, by using, as insulating coating, a polymeric composition comprising a polyethylene modified with at least one unsaturated carboxylic acid or a derivative thereof as defined hereinbelow [for simplicity, in the text hereinbelow, this is referred to as the compound of general formula (I)]. The compound of general formula (I) which is suitable for carrying out the present invention has high compatibility with the polyethylene, is readily dispersible therein and is capable of grafting to the polyethylene in high yield: consequently, the cable thus insulated is capable of giving better electrical performance qualities when used for high voltage direct current transmission or distribution, in particular in the presence of polarity reversals.

In a first aspect, the present invention thus relates to an electrical cable, particularly for high voltage direct current transmission or distribution, comprising at least one conductor and at least one extruded insulating coating layer consisting of a polymeric composition comprising a polyethylene modified with at least one compound of general formula (I):

in which

R represents H or $CH_3$;

$R_1$ represents a linear or branched, preferably linear, $C_1$–$C_8$ alkylene group;

$R_2$ represents OH; a group $OR_3$ in which $R_3$ represents a linear or branched $C_1$–$C_4$ alkyl group; a group $NR_4R_5$ in which $R_4$ and $R_5$, which may be identical or different, represent H, or a linear or branched $C_1$–$C_4$ alkyl group.

In the present description and in the claims which follow, the term "conductor" means a conductive element in unmodified form, of elongate shape and preferably made of a metal material, or a conductive element coated with a semiconducting layer. As will be specified more clearly hereinbelow, the latter solution, which envisages the use of a semiconducting layer on both the inside and outside of the insulating coating, is typically used for electrical cables.

In a second aspect, the present invention relates to an insulating composition comprising a polyethylene modified with at least one compound of general formula (I):

in which:
R represents H or CH$_3$;
R$_1$ represents a linear or branched, preferably linear, C$_1$-C$_8$ alkylene group;
R$_2$ represents OH; a group OR$_3$ in which R$_3$ represents a linear or branched C$_1$-C$_4$ alkyl group; a group NR$_4$R$_5$ in which R$_4$ and R$_5$, which may be identical or different, represent H, or a linear or branched C$_1$-C$_4$ alkyl group.

In a further aspect, the present invention relates to a method for reducing the accumulation of space charges in an electrical cable during the high voltage direct current transmission or distribution, comprising at least one conductor and at least one extruded insulating coating layer consisting of a polymeric composition comprising a polyethylene, said method comprising modifying said polyethylene with at least one compound of general formula (I):

in which:
R represents H or CH$_3$;
R$_1$ represents a linear or branched, preferably linear, C$_1$-C$_8$ alkylene group;
R$_2$ represents OH; a group OR$_3$ in which R$_3$ represents a linear or branched C$_1$-C$_4$ alkyl group; a group NR$_4$R$_5$ in which R$_4$ and R$_5$, which may be identical or different, represent H, or a linear or branched C$_1$-C$_4$ alkyl group.

According to a preferred embodiment, the polyethylene (PE) is an ethylene homopolymer or a copolymer of ethylene with at least one α-olefin having a density of between 0.860 g/cm$^3$ and 0.970 g/cm$^3$, preferably between 0.865 g/cm$^3$ and 0.940 g/cm$^3$.

For the purposes of the present description and the claims, the term "α-olefin" means an olefin of general formula CH$_2$=CH—R' in which R' represents a linear or branched alkyl group containing from 1 to 10 carbon atoms. The α-olefin may be chosen, for example, from: propylene, 1-butene, 1-pentene, 4-methyl-1-pentene, 1-hexene, 1-octene, 1-dodecene, or mixtures thereof. The following are preferred: 1-butene, 1-hexene and 1-octene. The amount of α-olefin optionally present is generally between 0.5 mol % and 15 mol %, preferably between 1 mol % and 10 mol %.

The polyethylene is preferably chosen from: high density polyethylene (HDPE) having a density of at least 0.940 g/cm$^3$, preferably of between 0.940 g/cm$^3$ and 0.960 g/cm$^3$; medium density polyethylene (MDPE) having a density of between 0.926 g/cm$^3$ and 0.940 g/cm$^3$; low density polyethylene (LDPE) and linear low density polyethylene (LLDPE) having a density of between 0.910 g/cm$^3$ and 0.926 g/cm$^3$.

According to one preferred embodiment, said polyethylene is modified by grafting with at least one compound of general formula (I). Said grafting may be carried out on the base polyethylene (pre-grafting) or during a process of cross-linking of the polymeric composition which constitutes the insulating coating layer. The grafting may be carried out according to known techniques such as, for example, a radical-mediated route in the presence of an organic peroxide.

According to a further embodiment, said polyethylene is modified by co-polymerization of the ethylene with at least one compound of general formula (I). The addition of said compound of general formula (I) may take place before or during the polymerization reaction: in this way, the compound of general formula (I) will be incorporated into the structure of the polymer and integrated into the polyethylene chain.

According to a preferred embodiment, the compound of general formula (I) is chosen from: unsaturated carboxylic acids such as, for example, vinylacetic acid, allylacetic acid, 4-methyl-4-pentenoic acid, 3-pentenoic acid, 10-undecenoic acid, or mixtures thereof; esters such as, for example, methyl allylacetate, ethyl allylacetate, isopropyl allylacetate, n-butyl allylacetate, isobutyl allylacetate, or mixtures thereof; amides such as, for example, N,N-dimethylallylacetamide, N,N-diethylallylacetamide, N,N-dibutylallylacetamide, N,N-dipropylallylacetamide, or mixtures thereof. Allylacetic acid is particularly preferred.

If the modified polyethylene is cross-linked, said cross-linking is carried out via a radical-mediated route by thermal decomposition of a radical initiator, usually of an organic peroxide such as, for example, dicumyl peroxide, t-butyl cumyl peroxide, 2,5-dimethyl-2,5-di(t-butylperoxy)hexane or di-t-butyl peroxide, which is absorbed onto the polyethylene before extrusion or is injected directly into the extruder. The amount of radical initiator used is generally between 0.1 and 5 parts by weight per 100 parts by weight of the composition.

In this case, the extrusion temperature of the material which constitutes the insulating coating layer is kept below the decomposition temperature of the peroxide used. For example, when dicumyl peroxide is used, the extruder temperature is maintained at about 130° C. to avoid scorching of the insulating material and the cross-linking process is carried out at a temperature of between 180° C. and 280° C.

The compound of general formula (I) grafts to the polyethylene in a grafting yield of between 80% and 100%. When residues of said unreacted compound of general formula (I) remain, said residues may be removed by degassing.

When the grafting takes place during the cross-linking of the material which constitutes the insulating coating layer, the addition of the compound of general formula (I) may be carried out either by absorbing this material onto polyethylene granules or powder before the extrusion or by injecting and mixing this material with the molten polyethylene during the extrusion.

Alternatively, as already mentioned above, a polyethylene modified by co-polymerization with at least one compound of general formula (I), or a polyethylene which has been modified beforehand by pre-grating with at least one compound of general formula (I), may be used. In this case also, the polyethylene thus modified may be cross-linked by working according to known techniques as described above.

The amount of compound of general formula (I) present in the insulating composition is generally between 0.01% and 7% by weight and preferably between 0.10% and 3% by weight.

The insulating composition described above may optionally comprise an effective amount of one or more conventional additives such as, for example, antioxidants, processing co-adjuvants, lubricants, pigments, water-tree retardants, voltage stabilizers, anti-scorching agents, and the like.

Antioxidants generally useful for this purpose include: 4,4'-thiobis(6-t-butyl-m-cresol) (known under the trade name Santonox® TBMC from Flexsys), tetrakis[3-(3,5-di-t-butyl-4-hydroxyphenyl)propionyloxymethyl]methane (known under the trade name Irganox® 1010 from Ciba), 2,2'-thiobis(4-methyl-6-t-butylphenol) (known under the trade name Irganox® 1081 from Ciba), 2,2'-thiodiethylenebis[(3-(3,5-di-t-butyl-4-hydroxyphenyl) propionate] (known under the trade name Irganox® 1035 from Ciba) and thiocarboxylic acid esters, or mixtures thereof.

BRIEF DESCRIPTION OF THE DRAWING.

The attached

DETAILED DESCRIPTION OF THE INVENTION.

Figure 1:
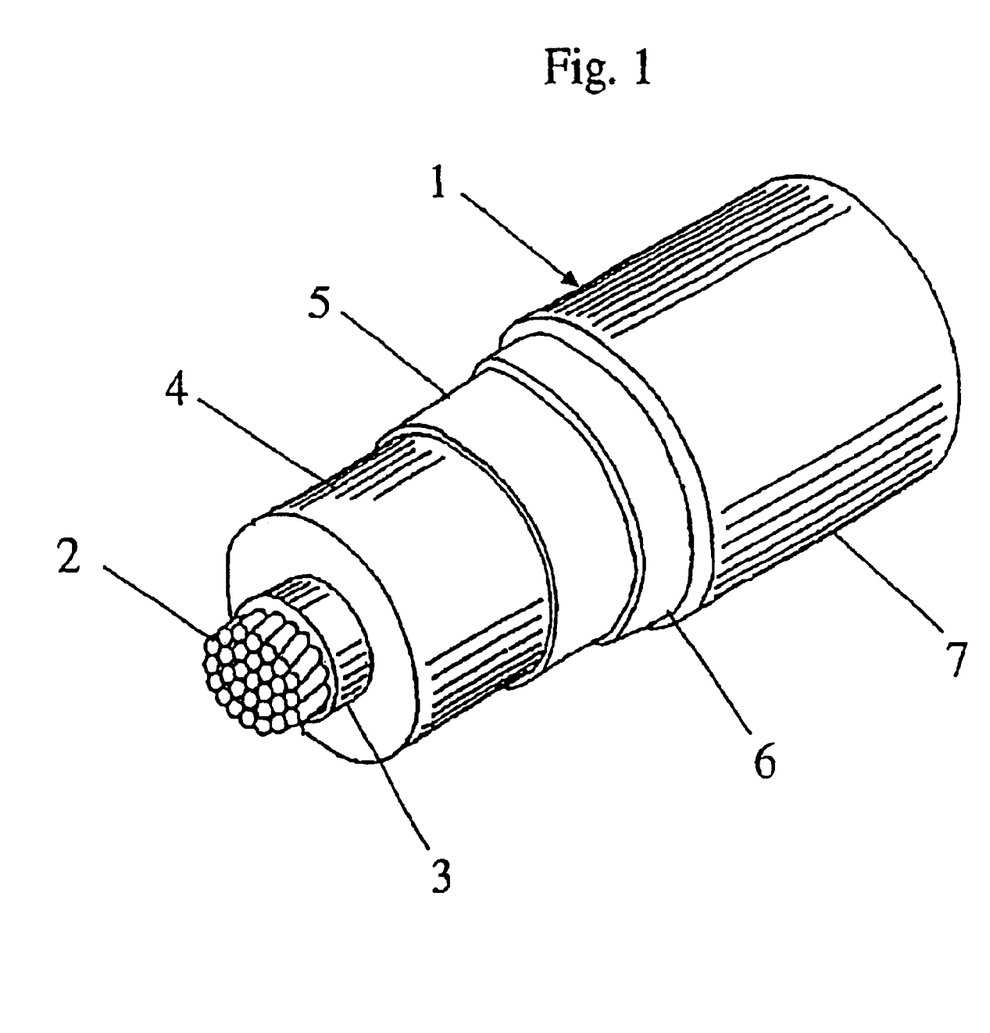
FIG. 1 illustrates one embodiment of the cable according to the present invention, and in particular shows, in perspective view, a section of cable with parts removed step by step to demonstrate its structure.

With reference to FIG. 1, the cable 1 according to the present invention comprises in sequence, from the centre outwards: a conductor 2, an inner semiconducting layer 3, an insulating coating layer 4, an outer semiconducting layer 5, a metal screen 6 and an outer sheath 7.

The conductor 2 generally consists of metal wires, preferably copper and aluminium wires, stranded together according to conventional techniques. The inner and outer semiconducting layers 3 and 5, generally consisting of a polyolefin-based polymeric composition containing a conductive filler (for example carbon black), are extruded over the conductor 2, separately or together with the insulating coating layer 4 according to the present invention. Around the outer semiconducting layer 5 is usually placed a screen 6, generally consisting of electrically conductive wires or tapes, wound helically. This screen is then covered with a sheath 7, consisting of a thermoplastic material, for example non-cross-linked polyethylene (PE) or, preferably, a propylene homopolymer or copolymer.

The cable may moreover be provided with an outer protective structure (not represented in FIG. 1) which serves mainly to protect the cable against mechanical impacts and/or compression. This protective structure may be, for example, metal armouring or a layer of expanded polymeric material as disclosed in patent application WO 98/52197.

FIG. 1 shows only one possible embodiment of a cable according to the present invention: it goes without saying that changes known in the art may be made to this embodiment without thereby departing from the scope of the present invention.

The cable according to the present invention can be prepared using known techniques for depositing layers of thermoplastic material, for example by means of extrusion. The extrusion is advantageously carried out in a single pass, for example by means of the "tandem" technique, in which individual extruders arranged in series are used, or by means of co-extrusion with a multiple-extrusion head.

The present invention is now further described in the example which follows, which is given purely for illustrative purposes and should not be considered as limiting the invention in any way.

EXAMPLE 1

99.5 g of low density polyethylene (LDPE LE 4201 S from Borealis, containing 2.1% by weight of dicumyl peroxide) and 0.5 g of allylacetic acid (Fluka; purity>98%) were introduced into a 200 ml round-bottomed flask with stirring.

The temperature was then raised to 50° C. and the mixture was maintained at this temperature, with stirring, for three hours until the allylacetic acid was completely absorbed.

Films were prepared from the mixture thus obtained, by press-moulding at 130° C. followed by cross-linking at 180° C.

The moulding conditions were as follows:

dimensions of the mould: 20×20 cm;

pressure: 170 bar;

amount of material: 4.5 g;

thermoforming temperature: 130° C.;

duration of thermoforming: 5 min;

cross-linking temperature: 180° C.;

cross-linking time: 30 min;

cooling time: 30 min.

The films obtained as described above were 20×20 cm in size and about 120 µm thick.

Samples 7×7 cm in size were cut from the abovementioned films and subjected to an electrical ageing test both in the absence and in the presence of polarity reversal: the results obtained are given in Table 1. Samples with the same polyethylene without addition of allylacetic acid were produced, as described above, for comparative purposes.

The test was carried out as follows.

The abovementioned samples were placed between two stainless steel electrodes having a Rogowski profile, immersed in a silicone oil so as to prevent external discharges during the test, and a direct-current electrical field equal to a gradient of 185 kV/mm with positive polarity was applied at ambient temperature. After 3 hours, the polarity was reversed and the operation was continued in this manner until all the samples were perforated. The test was repeated without reversing the polarity.

The lifetimes were calculated from the data obtained from the tests carried out on 8 samples by subjecting said data to Weibull processing: the results are given in Table 1.

TABLE 1

| | LIFETIME AT 185 kV/mm (hours) | |
| --- | --- | --- |
| MATERIAL | WITHOUT REVERSALS | WITH REVERSALS |
| XLPE | 150 | 60 |
| XLPE-g-AA* | 672 | 116 |

AA*: allylacetic acid

EXAMPLE 2

A high voltage cable prototype was produced, in which the insulating coating layer consisted of a polymeric composition according to the present invention.

The cable was prepared by co-extrusion of the three layers, using a three-head extruder, i.e. three separate extruders opening into a single extrusion head, so as to obtain the co-extrusion of the semiconductor coatings and of the insulating coating.

Thus, an aluminium conductor (consisting of a plurality of aluminium wires stranded together to form a cross section of about 70 mm²), was coated on the extrusion line with an inner semiconducting coating 0.5 mm thick comprising an ethylene/butyl acrylate copolymer and carbon black.

A 45 mm single-screw Bandera extruder, of configuration 20D, provided with four zones of heat regulation by using diathermic oil, was used to deposit said inner semiconducting coating.

Over said inner semiconducting coating was extruded an insulating coating 5.5 mm thick comprising low density polyethylene (LDPE LE 4201 S from Borealis) added with 0.5% by weight of allylacetic acid. The addition was carried out by injecting the allylacetic acid into the extruder opening, using a previously calibrated Ismatec piston pump, at a rate so as to give the desired concentration equal to 0.5% by weight.

A 100 mm single-screw Bandera extruder, in configuration 25D, provided with five zones of heat regulation by using diathermic oil and having the following temperature profile: from 115° C. to 125° C. in the cylinder, 115° C. on the collar and 115° C. in the head, was used to deposit said inner insulating coating.

An outer semiconducting coating 0.5 mm thick having the same composition as the inner semiconducting coating was then extruded in a position radially external to said insulating coating by working as described above.

A 60 mm single-screw Bandera extruder, in configuration 20D, provided with five zones of heat regulation by using diathermic oil, was used to deposit said outer semiconducting coating.

The extrusion line had a speed of 2 m/min. The cable thus obtained had an insulating coating layer of 5.5 mm. A thin slice equal to about 150 μm thick of said cable was cut off, using a microtome, and was then placed in an oven at 80° C. until the cross-linking by-products had been completely removed.

The sample thus obtained was characterized by infrared spectroscopy (FTIR), on a pre-calibrated machine, using the ratio between the band at 1711 cm$^{-1}$ (allylacetic acid) and the band at 1377 cm$^{-1}$ (polyethylene). The measurement was repeated, after treating the sample in a Soxhlet extractor with chloroform for 24 hours, so as to remove the ungrafted reaction products and obtain the grafting yield, which was equal to 100%.

What is claimed is:

1. An electrical cable comprising at least one conductor and at least one extruded insulating coating layer consisting of a polymeric composition comprising a polyethylene modified with at least one compound of general formula (I):

in which:

R represents H or $CH_3$;

$R_1$ represents a linear or branched $C_1$–$C_8$ alkylene group;

$R_2$ represents OH; a group $OR_3$ in which $R_3$ represents a linear or branched $C_1$–$C_4$ alkyl group; a group $NR_4R_5$ in which $R_4$ and $R_5$, which may be identical or different, represent H, or a linear or branched $C_1$–$C_4$ alkyl group.

2. The electrical cable according to claim 1, wherein $R_1$ represents a linear $C_1$–$C_8$ alkylene group.

3. The electrical cable according to claim 1, wherein the polyethylene is an ethylene homopolymer or a copolymer of ethylene with at least one α-olefin having a density between 0.860 g/cm$^3$ and 0.970 g/cm$^3$.

4. The electrical cable according to claim 3, wherein the polyethylene is an ethylene homopolymer or a copolymer of ethylene with at least one α-olefin having a density between 0.865 g/cm$^3$ and 0.940 g/cm$^3$.

5. The electrical cable according to claim 3, wherein the α-olefin is an olefin of general formula $CH_2$=CH—R' in which R' represents a linear or branched alkyl group containing from 1 to 10 carbon atoms.

6. The electrical cable according to claim 5, wherein the α-olefin is chosen from: propylene, 1-butene, 1-pentene, 4-methyl-1-pentene, 1-hexene, 1-octene, 1-dodecene, or mixtures thereof.

7. The electrical cable according to claim 1, wherein the polyethylene is chosen from: high density polyethylene having a density of at least 0.940 g/cm$^3$; medium density polyethylene having a density between 0.926 g/cm$^3$ and 0.940 g/cm$^3$; low density polyethylene and linear low density polyethylene having a density between 0.910 g/cm$^3$ and 0.926 g/cm$^3$.

8. The electrical cable according to claim 1, wherein the polyethylene is modified by pregrafting with at least one compound of general formula (I).

9. The electrical cable according to claim 8, wherein the polyethylene is not cross-linked.

10. The electrical cable according to claim 8, wherein the polyethylene is cross-linked.

11. The electrical cable according to claim 1, wherein the polyethylene is modified by grafting with at least one compound of general formula (I) during a process of cross-linking of the polymeric composition which constitutes the insulating coating layer.

12. The electrical cable according to claim 1, wherein the polyethylene is modified by copolymerization of the ethylene with at least one compound of general formula (I).

13. The electrical cable according to claim 12, wherein the polyethylene is not cross-linked.

14. The electrical cable according to claim 12, wherein the polyethylene is cross-linked.

15. The electrical cable according to claim 1, wherein the compound of general formula (I) is chosen from: vinylacetic acid, allylacetic acid, 4-methyl-4-pentenoic acid, 3-pentenoic acid, 10-undecenoic acid, or mixtures thereof.

16. The electrical cable according to claim 15, wherein the compound of general formula (I) is allylacetic acid.

17. The electrical cable according to claim 1, wherein the compound of general formula (I) is chosen from: methyl allylacetate, ethyl allylacetate, isopropyl allylacetate, n-butyl allylacetate, isobutyl allylacetate, or mixtures thereof.

18. The electrical cable according to claim 1, wherein the compound of general formula (I) is chosen from: N,N-dimethylallylacetamide, N,N-diethylallylacetamide, N,N-dibutylallylacetamide, N,N-dipropyllallylacetamide or mixtures thereof.

19. The electrical cable according to claim 1, wherein the compound of general formula (I) is present in an amount between 0.01 % and 7% by weight.

20. The electrical cable according to claim 19, wherein the compound of general formula (I) is present in an amount between 0.10% and 3% by weight.

21. An insulating composition comprising a polyethylene modified with at least one compound of general formula (I):

in which:
R represents H or CH$_3$;
R$_1$ represents a linear or branched C$_1$–C$_8$ alkylene group;
R$_2$ represents OH; a group OR$_3$ in which R$_3$ represents a linear or branched C$_1$–C$_4$ alkyl group; a group NR$_4$R$_5$ in which R$_4$ and R$_5$, which may be identical or different, represent H, or a linear or branched C$_1$–C$_4$ alkyl group.

22. The insulating composition according to claim 21, wherein the polyethylene is an ethylene homopolymer or a copolymer of ethylene with at least one α-olefin having a density between 0.860 g/cm$_3$ and 0.970 g/cm$_3$.

23. The insulating composition according to claim 22, wherein the polyethylene is an ethylene homopolymer or a copolymer of ethylene with at least one α-olefin having a density between 0.865 g/cm$^3$ and 0.940 g/cm$^3$.

24. The insulating composition according to claim 22, wherein the α-olefin is an olefin of general formula CH$_2$=CH—R' in which R' represents a linear or branched alkyl group containing from 1 to 10 carbon atoms.

25. The insulating composition according to claim 24, wherein the α-olefin is chosen from: propylene, 1-butene, 1-pentene, 4-methyl-1-pentene, 1-hexene, 1-octene, 1-dodecene, or mixtures thereof.

26. The insulating composition according to claim 21, wherein the polyethylene is chosen from: high density polyethylene having a density of at least 0.940 g/cm$^3$; medium density polyethylene having a density between 0.926 g/cm$^3$ and 0.940 g/cm$^3$; low density polyethylene and linear low density polyethylene having a density between 0.910 g/cm$^3$ and 0.926 g/cm$^3$.

27. The insulating composition according to claim 21, wherein the polyethylene is modified by pregrafting with at least one compound of general formula (I).

28. The insulating composition according to claim 27, wherein the polyethylene is not cross-linked.

29. The insulating composition according to claim 27, wherein the polyethylene is cross-linked.

30. The insulating composition according to claim 21, wherein the polyethylene is modified by grafting with at least one compound of general formula (I) during a process of cross-linking of the polymeric composition which constitutes the insulating coating layer.

31. The insulating composition according to claim 21, wherein the polyethylene is modified by copolymerization of the ethylene with at least one compound of general formula (I).

32. The insulating composition according to claim 31, wherein the polyethylene is not cross-linked.

33. The insulating composition according to claim 31, wherein the polyethylene is cross-linked.

34. The insulating composition according to claim 21, wherein the compound of general formula (I) is chosen from: vinylacetic acid, allylacetic acid, 4-methyl-4-pentenoic acid, 3-pentenoic acid, 10-undecenoic acid, or mixtures thereof.

35. The insulating composition according to claim 34, wherein the compound of general formula (I) is allylacetic acid.

36. The insulating composition according to claim 21, wherein the compound of general formula (I) is chosen from: methyl allylacetate, ethyl allylacetate, isopropyl allylacetate, n-butyl allylacetate, isobutyl allylacetate, or mixtures thereof.

37. The insulating composition according to claim 21, wherein the compound of general formula (I) is chosen from: N,N-dimethylallylacetamide, N,N-diethylallylacetamide; N,N-dibutylallylacetamide, N,N-dipropyllallylacetamide, or mixtures thereof.

38. The insulating composition according to claim 21, wherein the compound of general formula (I) is present in an amount between 0.01 % and 7% by weight.

39. The insulating composition according to claim 38, wherein the compound of general formula (I) is present in an amount between 0.10% and 3% by weight.

40. A method for reducing the accumulation of space charges in an electrical cable during high voltage direct current transmission or distribution, comprising at least one conductor and at least one extruded insulating coating layer consisting of a polymeric composition comprising a polyethylene, said method comprising modifying said polyethylene with at least one compound of general formula (I):

in which:
R represents H or CH$_3$;
R$_1$ represents a linear or branched C$_1$–C$_8$ alkylene group;
R$_2$ represents OH; a group OR$_3$ in which R$_3$ represents a linear or branched C$_1$–C$_4$ alkyl group; a group NR$_4$R$_5$ in which R$_4$ and R$_5$, which may be identical or different, represent H, or a linear or branched C$_1$–C$_4$ alkyl group.

41. The method according to claim 40, wherein the polyethylene is an ethylene homopolymer or a copolymer or ethylene with at least one α-olefin having a density of between 0.860 g/cm$^3$ and 0.970 g/cm$^3$.

42. The method according to claim 41, wherein the polyethylene is an ethylene homopolymer or a copolymer of ethylene with at least one α-olefin having a density between 0.865 g/cm$^3$ and 0.940 g/cm$^3$.

43. The method according to claim 41, wherein the α-olefin is an olefin of general formula CH$_2$=CH—R' in which R' represents a linear or branched alkyl group containing from 1 to 10 carbon atoms.

44. The method according to claim 43, wherein the α-olefin is chosen from: propylene, 1-butene, 1-pentene, 4-methyl-1-pentene, 1-hexene, 1-octene, 1-dodecene, or mixtures thereof.

45. The method according to claim 40, wherein the polyethylene is chosen from: high density polyethylene having a density of at least 0.940 g/cm$^3$; medium density polyethylene having a density between 0.926 g/cm$^3$ and 0.940 g/cm$^3$; low density polyethylene and linear low density polyethylene having a density between 0.910 g/cm$^3$ and 0.926 g/cm$^3$.

46. The method according to claim 40, wherein the polyethylene is modified by pregrafting with at least one compound of general formula (I).

47. The method according to claim 46, wherein the polyethylene is not cross-linked.

48. The method according to claim 46, wherein the polyethylene is cross-linked.

49. The method according to claim 40, wherein the polyethylene is modified by grafting with at least one compound of general formula (I) during a process of cross-linking of the polymeric composition which constitutes the insulating coating layer.

50. The method according to claim 40, wherein the polyethylene is modified by copolymerization of the ethylene with at least one compound of general formula (I).

51. The method according to claim 50, wherein the polyethylene is not cross-linked.

52. The method according to claim 50, wherein the polyethylene is cross-linked.

53. The method according to claim 40, wherein the compound of general formula (I) is chosen from vinylacetic acid, allylacetic acid, 4-methyl-4-pentenoic acid, 3-pentenoic acid, 10-undecenoic acid, or mixtures thereof.

54. The method according to claim 53, wherein the compound of general formula (I) is allylacetic acid.

55. The method according to claim 40, wherein the compound of general formula (I) is chosen from: methyl allylacetate, ethyl allylacetate, isopropyl allylacetate, n-butyl allylacetate, isobutyl allylacetate, or mixtures thereof.

56. The method according to claim 40, wherein the compound of general formula (I) is chosen from: N,N-dimethylallylacetamide, N,N-diethylallylacetamide, N,N-dibutylallylacetamide, N, N-dipropylallylacetamide, or mixtures thereof.

57. The method according to claim 40, wherein the compound of general formula (I) is present in an amount between 0.01% and 7% by weight.

58. The method according to claim 57, wherein the compound of general formula (I) is present in an amount between 0.10% and 3% by weight.

* * * * *

UNITED STATES PATENT AND TRADEMARK OFFICE
CERTIFICATE OF CORRECTION

PATENT NO. : 6,903,263 B2
DATED : June 7, 2005
INVENTOR(S) : Gabriele Perego et al.

It is certified that error appears in the above-identified patent and that said Letters Patent is hereby corrected as shown below:

<u>Title page,</u>
Item [73], Assignee, after "Pirelli", delete the comma.
Item [57], ABSTRACT,
Line 2, "at least once" should read -- at least one --.

<u>Column 9,</u>
Line 59, "$C_1$-$C_4$" should read -- $C_1$-$C_4$ --.

<u>Column 10,</u>
Line 62, "0.01 %" should read -- 0.01% --.

<u>Column 11,</u>
Line 17, "$g/cm_3$" (both occurrences) should read -- $g/cm^3$ --.

<u>Column 12,</u>
Line 10, "0.01 %" should read -- 0.01% --.

Signed and Sealed this

Fourth Day of October, 2005

JON W. DUDAS
*Director of the United States Patent and Trademark Office*